US012569839B2

(12) United States Patent
Vjunov et al.

(10) Patent No.: US 12,569,839 B2
(45) Date of Patent: Mar. 10, 2026

(54) EMISSION CONTROL CATALYST ARTICLE WITH ENRICHED PGM ZONE, METHOD AND APPARATUS TO PRODUCE THE SAME

(71) Applicant: BASF MOBILE EMISSIONS CATALYSTS LLC, Iselin, NJ (US)

(72) Inventors: Aleksei Vjunov, Iselin, NJ (US); Yipeng Sun, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 907 days.

(21) Appl. No.: 17/756,121

(22) PCT Filed: Dec. 16, 2020

(86) PCT No.: PCT/US2020/065232
§ 371 (c)(1),
(2) Date: May 18, 2022

(87) PCT Pub. No.: WO2021/126918
PCT Pub. Date: Jun. 24, 2021

(65) Prior Publication Data
US 2023/0338938 A1      Oct. 26, 2023

Related U.S. Application Data

(60) Provisional application No. 62/950,265, filed on Dec. 19, 2019.

(51) Int. Cl.
B01J 35/00 (2024.01)
B01D 53/94 (2006.01)
(Continued)

(52) U.S. Cl.
CPC ............ B01J 35/19 (2024.01); B01D 53/945 (2013.01); B01D 53/9454 (2013.01);
(Continued)

(58) Field of Classification Search
CPC ... B01J 35/19; B01J 21/04; B01J 23/10; B01J 23/44; B01J 23/464; B01J 35/394;
(Continued)

(56) References Cited

U.S. PATENT DOCUMENTS

2008/0286176 A1    11/2008  Schirmeister et al.
2012/0283091 A1    11/2012  Sunada et al.
(Continued)

FOREIGN PATENT DOCUMENTS

EP          2 796 260 A1     10/2014
EP          3 632 537 A1      4/2020
(Continued)

OTHER PUBLICATIONS

International Search Report dated Mar. 29, 2021, International Application No. PCT/US2020/065232.
(Continued)

*Primary Examiner* — Daniel C. Mccracken
*Assistant Examiner* — Starfari Teshawn Mcclain
(74) *Attorney, Agent, or Firm* — DLA Piper LLP (US)

(57) ABSTRACT

The presently claimed invention provides an emission control catalyst article comprising a substrate having an inlet axial end and an outlet axial end, a bottom washcoat layer coated on the 60 to 100% length of the substrate from the inlet axial end to the outlet axial end, and a top washcoat layer coated on the 60 to 100% length of the substrate from the inlet or the outlet or both end of the substrate such that the top coat covers at least 60% of the length of the bottom washcoat layer, wherein at least part of the top washcoat layer and/or the bottom washcoat layer comprises a first portion and a second portion, wherein the first portion begins at the inlet axial end or the outlet axial end of the substrate and exhibits a platinum group metal concentration of 2 to 100 times higher than the concentration of a platinum group
(Continued)

metal in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft, as determined axially from a first end of the first portion to a second end of the first portion. The platinum group metal of the first portion is deposited by spraying a platin group metal precursor solution using an apparatus comprising a spray nozzle connected to the dosing unit via a second supply tube, a control arm device connected to the spray nozzle, wherein said control arm device is adapted to allow the 3-D positioning of the nozzle relative to a substrate face and adapt the radial and/or axial deposition of the platinum group metal within the individual channels.

22 Claims, 4 Drawing Sheets

(51) Int. Cl.

| | |
|---|---|
| *B01J 21/04* | (2006.01) |
| *B01J 23/10* | (2006.01) |
| *B01J 23/44* | (2006.01) |
| *B01J 23/46* | (2006.01) |
| *B01J 35/30* | (2024.01) |
| *B01J 35/56* | (2024.01) |
| *B01J 37/02* | (2006.01) |
| *B01J 37/08* | (2006.01) |
| *F01N 3/28* | (2006.01) |

(52) U.S. Cl.
CPC ..... *B01D 53/9468* (2013.01); *B01D 53/9472* (2013.01); *B01J 21/04* (2013.01); *B01J 23/10* (2013.01); *B01J 23/44* (2013.01); *B01J 23/464* (2013.01); *B01J 35/394* (2024.01); *B01J 35/56* (2024.01); *B01J 37/0228* (2013.01); *B01J 37/0236* (2013.01); *B01J 37/0244* (2013.01); *B01J 37/0248* (2013.01); *B01J 37/088* (2013.01); *F01N 3/2828* (2013.01); *B01D 2255/1021* (2013.01); *B01D 2255/1023* (2013.01); *B01D 2255/1025* (2013.01); *B01D 2255/9022* (2013.01); *B01D 2255/9032* (2013.01); *B01D 2259/4566* (2013.01); *F01N 2330/06* (2013.01); *F01N 2370/02* (2013.01)

(58) Field of Classification Search
CPC .... B01J 35/56; B01J 37/0228; B01J 37/0236; B01J 37/0244; B01J 37/0248; B01J 37/088; B01J 35/396; B01J 23/40; B01J 37/0221; B01J 37/0232; B01J 37/0242; B01D 53/945; B01D 53/9454; B01D 53/9468; B01D 53/9472; B01D 2255/1021; B01D 2255/1023; B01D 2255/1025; B01D 2255/9022; B01D 2255/9032; B01D 2259/4566; B01D 2255/2042; B01D 2255/2061; B01D 2255/2063; B01D 2255/2065; B01D 2255/2066; B01D 2255/2068; B01D 2255/407; B01D 2255/908; B01D 2255/9155; B01D 2255/9205; F01N 3/2828; F01N 2330/06; F01N 2370/02; Y02T 10/12
See application file for complete search history.

(56) References Cited

U.S. PATENT DOCUMENTS

| | | | |
|---|---|---|---|
| 2013/0310248 A1 | 11/2013 | Yuki et al. | |
| 2018/0304238 A1* | 10/2018 | Saito | B01J 37/0244 |
| 2019/0105637 A1 | 4/2019 | Suzuki et al. | |

FOREIGN PATENT DOCUMENTS

| | | | | |
|---|---|---|---|---|
| JP | 2010227798 A | * 10/2010 | | B01J 35/19 |
| WO | WO 2010/001226 A1 | 1/2010 | | |
| WO | WO-2018216817 A1 | * 11/2018 | | F01N 3/10 |

OTHER PUBLICATIONS

Heck, et al., "The Preparation of Catalytic Materials: Carriers, Active Components and Monolithic Substrates", Catalytic Air Pollution Control: Commercial Technology, Second, Edition, 2002.

* cited by examiner

EMISSION CONTROL CATALYST ARTICLE WITH ENRICHED PGM ZONE, METHOD AND APPARATUS TO PRODUCE THE SAME

CROSS-REFERENCE TO RELATED APPLICATIONS

This application is a national stage filing under 35 U.S.C. § 371 of International Application No. PCT/US2020/065232, filed on Dec. 16, 2020, which claims the benefit of priority to U.S. Provisional Application No. 62/950,265, filed on Dec. 19, 2019; the disclosure of each of these applications are each incorporated herein by reference in its entirety.

FIELD OF THE DISCLOSURE

The presently claimed invention relates to an emission control catalyst article useful for the treatment of the exhaust gases to reduce contaminants contained therein and a method and an apparatus to prepare the said emission control catalyst. Particularly, the presently claimed invention relates to the emission control catalyst article with an axially and/or radially enriched PGM zone and method and an apparatus for preparing the catalyst article.

BACKGROUND

Three-way conversion (TWC) catalysts (hereinafter interchangeably referred to as three-way conversion catalyst, three-way catalyst, TWC Catalyst, and TWC) have been utilized in the treatment of the exhaust gas streams from the internal combustion engines for several years. Generally, in order to treat or purify the exhaust gas containing pollutants such as hydrocarbons, nitrogen oxides, and carbon monoxide, catalytic converters containing a three-way conversion catalyst are used in the exhaust gas line of an internal combustion engine. The three-way conversion catalyst is typically known to oxidize unburnt hydrocarbon and carbon monoxide and reduce nitrogen oxides. Most of the commercially available TWC catalysts contain palladium as a major platinum group metal component which is used along with a lesser amount of rhodium.

The catalyst is formed by coating the platinum group metal containing slurry on a substrate and the coated layer may be in the form of a layered structure having a bottom layer and a top layer. The platinum group metals are coated on the substrate uniformly with a PGM loading ranging from 3 to 300 g/ft$^3$. In another technique, the platinum group metals are coated on the substrate in a zoned manner.

However, it is found that the existing catalysts are still required to be improved in terms of the washcoat architecture, PGM type and loading amount as well as coating strategy and method in order to achieve higher reduction of pollutants such as NO$_x$, HC and CO.

Accordingly, it is envisaged to apply an additional PGM enrichment zone which can be deposited on a bottom layer or a top layer at the inlet or outlet portion of the substrate in an axial and/or radial zone containing high loading of PGM (up to 1000 g/ft$^3$) in order to achieve significantly higher pollutant reduction. The said design approach allows formation of complex PGM enrichment structures, e.g. resembling an inverted conical pyramid, a vortex or a star pattern extending into the underlying washcoat.

SUMMARY OF THE INVENTION

The present invention provides an emission control catalyst article comprising:

a substrate having an inlet axial end and an outlet axial end, a bottom washcoat layer coated on the 60 to 100% length of the substrate from the inlet axial end to the outlet axial end, and a top washcoat layer coated on the 60 to 100% length of the substrate from the inlet axial end or the outlet axial end or both ends of the substrate such that the top coat covers at least 60% of the length of the bottom washcoat layer, wherein at least part of the top washcoat layer and/or the bottom washcoat layer comprises a first portion and a second portion, wherein the first portion begins at the inlet axial end or the outlet axial end of the substrate and exhibits a platinum group metal concentration of 2 to 100 times higher than the concentration of a platinum group metal in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft$^3$, as determined axially from a first end of the first portion to a second end of the first portion.

In accordance with another aspect of the presently claimed invention there is also provided a process for preparing the emission control catalyst article which involves creating a three-dimensional axial and/or radial zone arrangement for platinum group metal enrichment using a spray nozzle apparatus.

In accordance with still another aspect of the presently claimed invention there is also provided an apparatus for preparing the catalytic article comprising a PGM precursor solution storage unit, a dosing unit for PGM precursor solution, at least one PGM precursor solution supply tube connected to the dosing unit, a spray nozzle connected to the dosing unit via a second supply tube, a control arm device connected to the spray nozzle that is optionally connected to an air supply means, wherein said control arm device is adapted to allow the 3-D positioning of the nozzle relative to a substrate face, and optionally, an additional air supply or diversion means, optionally with vacuum capability, said apparatus is adapted to spray a PGM precursor solution and create a three-dimensional axial and/or radial zone arrangement comprising a geometric shape starting from an inlet or outlet axial end of the substrate.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

DETAILED DESCRIPTION

Figure 1:
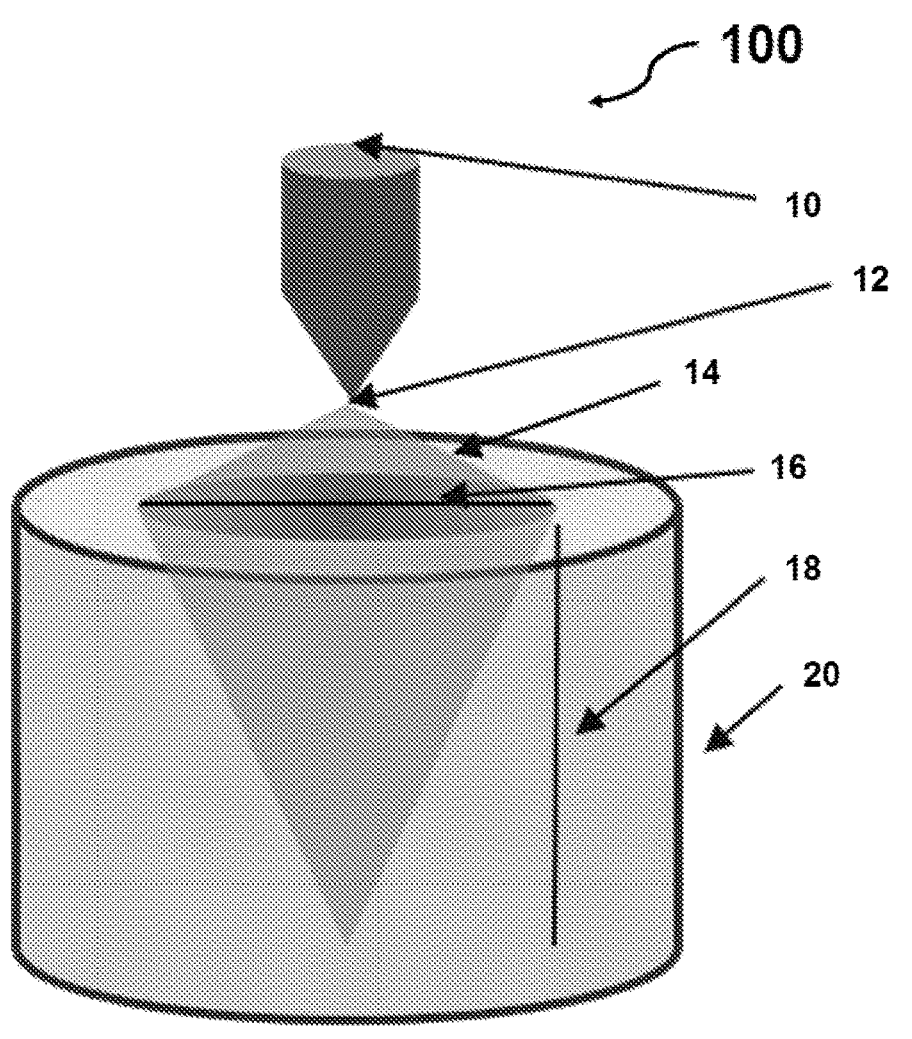
FIG. 1 is a schematic representation of an apparatus (100) for depositing nebulized PGM precursor solution onto the blank or washcoated catalyst substrate.

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

The platinum group metal (PGM) refers to any component that includes a PGM (Rh, Pd, and Pt). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," and the like refer to the respective platinum group metal compound, complex, or the like which, upon calcination or use of the catalyst, decomposes or otherwise converts to a catalytically active form, usually the metal or the metal oxide.

As used herein, the term "catalyst" or "catalyst composition" refers to a material that promotes a reaction.

The term "catalytic article" or "catalyst article" or "catalyst" refers to a component in which a substrate is coated with catalyst composition which is used to promote a desired reaction. In one embodiment, the catalytic article is a layered catalytic article. The term layered catalytic article refers to a catalytic article in which a substrate is coated with a PGM composition(s) in a layered fashion. These composition(s) may be referred to as washcoat(s).

The term "$NO_x$" refers to nitrogen oxide compounds, such as NO and/or $NO_2$.

In one aspect, the presently claimed invention provides an emission control catalyst article comprising a substrate having an inlet axial end and an outlet axial end, a bottom washcoat layer coated on the 60 to 100% length of the substrate from the inlet axial end to the outlet axial end, and a top washcoat layer coated on the 60 to 100% length of the substrate from the inlet axial end or the outlet axial end or both ends of the substrate such that the top coat covers at least 60% of the length of the bottom washcoat layer, wherein at least part of the top washcoat layer and/or the bottom washcoat layer comprises a first portion and a second portion, wherein the first portion begins at the inlet axial end or the outlet axial end of the substrate and exhibits a platinum group metal concentration of 2 to 100 times higher than the concentration of a platinum group metal in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 $g/ft^3$, as determined axially from a first end of the first portion to a second end of the first portion.

In accordance with the presently claimed invention the three-dimensional axial and/or radial zone arrangement starting from the inlet axial end or the outlet axial end or both is a geometric shape having a base covering from 20 to 100% of a substrate face from the respective substrate end and volume from 5 and 50% of the substrate volume. In the context of the present invention the terms "inlet axial end" and "outlet axial end" can be used interchangeably with "first axial end" and "second axial end" respectively. In one embodiment, the first portion has an axial length ranging from 5-50% of the substrate from the inlet end or the outlet end and covers 20-100% of a substrate inlet or outlet face such that the total volume of a formed geometric shape is from 5 to 50% of the substrate volume. The three-dimensional axial and/or radial zone arrangement comprises a geometric shape selected from a cone, a tapered cone, an asymmetric cone, a round cylinder, an elliptic cylinder, a polygonic cylinder, a round pyramid, an elliptic pyramid, a polygonic pyramid, a cuboid, a paraboloid, a half-ellipsoid, a semi-sphere, a polygonic prism, a parallelepiped, a rhombohedron, a polyhedron, a hyperboloid and the like. The three-dimensional axial and/or radial zone arrangement starting from the inlet axial end or outlet axial end with a geometric shape is being created through axial, radial or simultaneous axial and radial coating of the substrate using a spray nozzle or an apparatus comprising a spray nozzle. The first portion of the top or the bottom washcoat is referred as an enrichment zone formed by coating at least a portion of the top washcoat layer and/or the bottom washcoat layer, which is optionally pre-loaded with a platinum group metal on the total length of the substrate, with an additional platinum group metal solution that is deposited in a nebulized form. The platinum group metal utilized in the washcoat or in the enrichment zone is selected from platinum, palladium, rhodium and a combination thereof. The platinum group metal is typically supported on a support selected from oxygen storage component, alumina component, ceria component, zirconia component and a combination thereof, wherein the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof; the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof; and the zirconia component comprises lanthana-zirconia, and barium-zirconia. In accordance with one embodiment of the present invention, at least 40-100% of platinum group metal in the first portion is distributed with a gradient no more than 50% through the washcoat within the first portion, as determined by an electron-probe microanalysis (EPMA) line scan from an uppermost layer of the first portion to the substrate. In another embodiment, 50% or more of platinum group metal in the first portion exists in the uppermost % of the first portion, as determined by an electron-probe microanalysis (EPMA) line scan from an uppermost layer of the of the first portion of the enriched washcoat layer to the substrate. In one embodiment, 50% to 95% of platinum group metal in the first portion exists in an uppermost ⅓ of the first portion, as determined by an electron-probe microanalysis (EPMA) line scan from an uppermost layer of the of the first portion of the enriched washcoat layer to the substrate. In one embodiment, the first portion comprises palladium. The amount of palladium in the first portion is 30 to 100 wt. % of the total palladium present in the catalyst article. In another embodiment, the first portion comprises platinum. The amount of platinum in the first portion is 30 to 100 wt. % of the total platinum present in the catalyst article. In still another embodiment, the first portion comprises rhodium. In one embodiment, the weight ratio of the platinum group metal of the first portion to the platinum group metal of the second portion is 4.0 to 50.

In one exemplary embodiment, the emission control catalyst article comprises:

a bottom washcoat layer comprising palladium or platinum deposited on a support selected from oxygen storage component, alumina component and a combination thereof, coated on the 60 to 100% length of the substrate from the inlet axial end to the outlet axial end;

wherein at least part of the bottom washcoat layer comprises a first portion and a second portion, wherein the first portion begins at the inlet axial end or the outlet axial end of the substrate and comprises palladium or platinum optionally supported on a support selected from oxygen storage component, alumina component and a combination thereof, wherein the concentration of palladium or platinum in the first portion is 2 to 100 times higher than the concentration of palladium or platinum in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft³, as determined axially from a first end of the first portion to a second end of the first portion, a top washcoat layer comprising rhodium, platinum or a combination thereof impregnated on a support selected from oxygen storage component, alumina component and a combination thereof, coated on the 60 to 100% length of the substrate from either the inlet axial end or the outlet end of the substrate such that the top coat covers at least 60% of the length of the bottom washcoat layer.

In another exemplary embodiment, the emission control catalyst article comprises:

a bottom washcoat layer comprising palladium impregnated on a support selected from oxygen storage component, alumina component and a combination thereof, coated on the 60 to 100% length of the substrate from the inlet axial end to the outlet axial end; and a top washcoat layer comprising rhodium, platinum, palladium or a combination thereof impregnated on a support selected from oxygen storage component, alumina component and a combination thereof, coated on the 60 to 100% length of the substrate from either the inlet or the outlet end of the substrate such that the top coat covers at least 60% of the length of the bottom washcoat layer, wherein at least part of the top washcoat layer comprises a first portion and a second portion, wherein the first portion begins at an inlet axial end of the substrate and comprises palladium or platinum optionally supported on a support selected from oxygen storage component, alumina component and a combination thereof, wherein the concentration of palladium or platinum in the first portion is 2 to 100 times higher than the concentration of palladium or platinum in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft³, as determined axially from a first end of the first portion to a second end of the first portion, In one embodiment, the bottom washcoat layer comprises at least one alkaline earth metal oxide comprising barium oxide, strontium oxide, or any combination thereof, in an amount of 1.0 to 20 wt. %, based on the total weight of the top layer.

Reference to "monolithic substrate" or "honeycomb substrate" means a unitary structure that is homogeneous and continuous from inlet to outlet. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 15-60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions.

The catalyst article may be "fresh" meaning it is new and has not been exposed to any heat or thermal stress for a prolonged period of time. "Fresh" may also mean that the catalyst was recently prepared and has not been exposed to any exhaust gases or elevated temperatures. Likewise, an "aged" catalyst article is not fresh and has been exposed to exhaust gases and elevated temperatures (i.e., greater than 500° C.) for a prolonged period of time (i.e., greater than 3 hours).

According to one or more embodiments, the substrate of the catalytic article of the presently claimed invention may be constructed of any material typically used for preparing automotive catalysts and typically comprises a ceramic or a metal monolithic honeycomb structure. In one embodiment, the substrate is ceramic substrate, metal substrate, ceramic foam substrate, polymer foam substrate or woven fibre substrate.

The substrate typically provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8% of aluminium, and up to 20 wt. % of nickel. The alloys may also contain small or trace amounts of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 900 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4.0 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

Figure 4A:
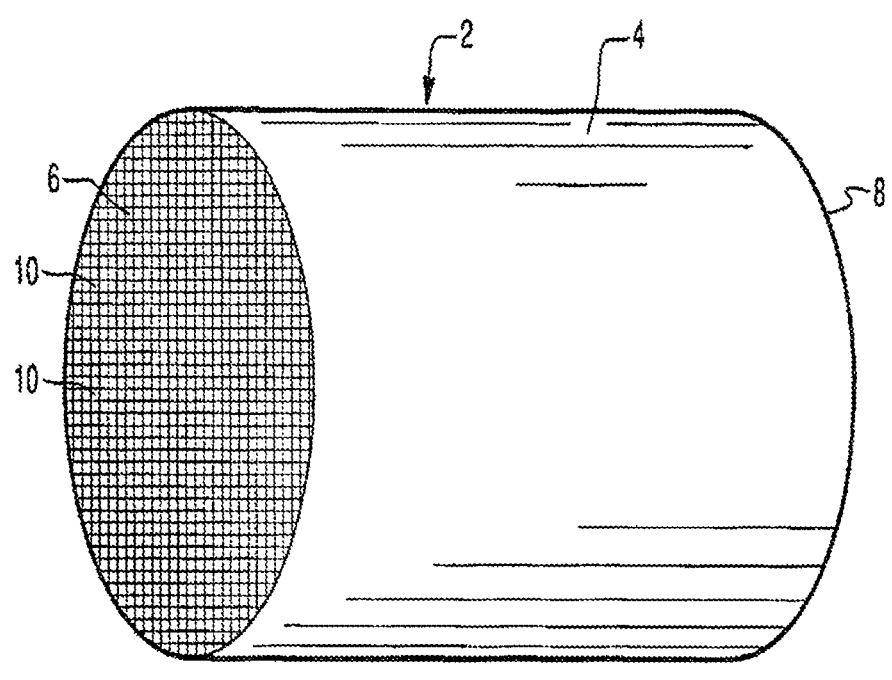
FIG. 4A is a perspective view of a honeycomb-type substrate carrier which may comprise the catalyst composition in accordance with one embodiment of the presently claimed invention.
Figure 4B:
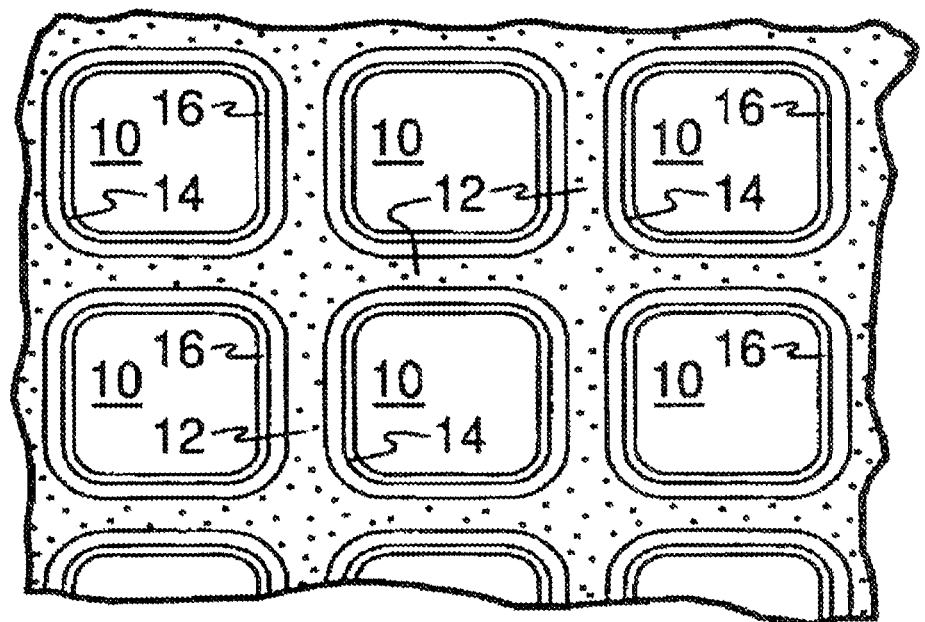
FIG. 4B is a partial cross-section view enlarged relative to FIG. 4A and taken along a plane parallel to the end faces of the substrate carrier of FIG. 4A, which shows an enlarged view of a plurality of the gas flow passages shown in FIG. 4A.

FIGS. 4A and 4B illustrate an exemplary substrate 2 in the form of a flow-through substrate coated with washcoat compositions as described herein. Referring to FIG. 4A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 4B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 5, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 5:
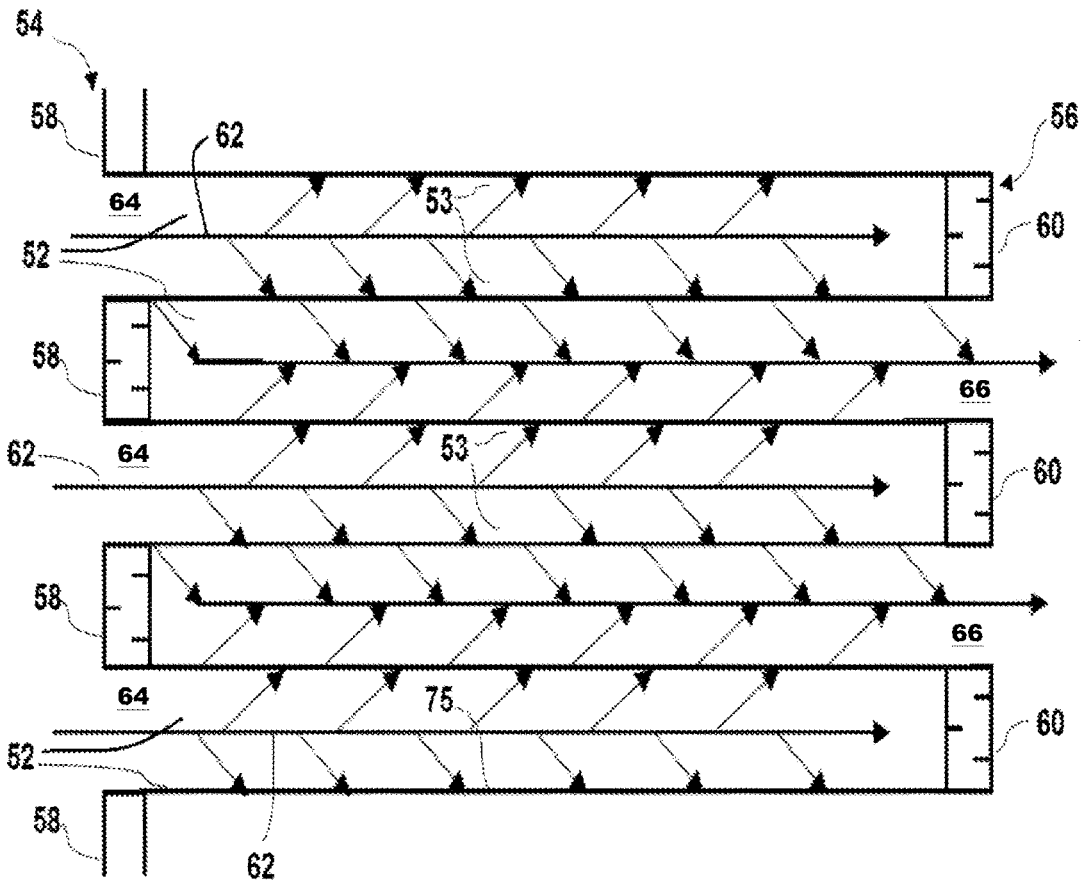
FIG. 5 is a cutaway view of a section enlarged relative to FIG. 4A, wherein the honeycomb-type substrate in FIG. 4A represents a wall flow filter substrate monolith.

FIG. 5 illustrates an exemplary substrate 2 in the form of a wall flow filter substrate coated with a washcoat composition as described herein. As seen in FIG. 5, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56.

A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In another aspect, there is also provided a process for the preparation of an emission control catalyst article, the process comprises:

i) obtaining a slurry optionally comprising platinum group metal impregnated onto at least one support and coating said slurry on the 60 to 100% length of the substrate from the inlet axial end to the outlet axial end the substrate to obtain a bottom washcoat layer;

ii) coating at least a portion of the bottom washcoat layer which begins at an inlet axial end or outlet axial of the substrate with a nebulized platinum group metal precursor solution using a nozzle spray or an apparatus comprising a nozzle spray to create a three-dimensional axial and/or radial zone arrangement starting from the inlet axial end or the outlet end, followed by drying at a temperature of about 100 to 140° C. and calcination to obtain an enrichment zone; and iii) preparing a top washcoat coated on the 60 to 100% length of the substrate from either the inlet axial end or the outlet axial end of the substrate such that the top coat covers at least 60% of the length of the bottom washcoat layer, comprising obtaining a slurry comprising platinum group metal(s) impregnated onto at least one support and coating the slurry over the at least 60% length of the bottom washcoat.

In one embodiment, the process for the preparation of an emission control catalyst article comprises:

i) preparing of a bottom washcoat layer coated on the 60 to 100% length of the substrate from the inlet axial end to the outlet axial end, comprising obtaining a slurry optionally containing a platinum group metal impregnated onto at least one support and coating said slurry on the total length of the substrate;

ii) preparing a top washcoat coated on the 60 to 100% length of the substrate from either the inlet axial end or the outlet axial end of the substrate such that the top coat covers at least 60% of the length of the bottom washcoat layer, comprising obtaining a slurry comprising platinum group metal(s) impregnated onto at least one support and coating the slurry over at least 60% length of the bottom washcoat; and iii) coating a portion of the top washcoat layer which begins at an inlet axial end or an outlet end of the substrate with a nebulized platinum group metal precursor solution using a nozzle spray or an apparatus comprising a nozzle spray to create a three-dimensional axial and/or radial zone arrangement starting from the inlet axial end or the outlet end, followed by drying at a temperature of about 100 to 140° C. and calcination to obtain an enrichment zone.

The process according to the presently claimed invention unlike the prior art is carried out without substrate masking to control the PGM deposition pattern. It is found that the deposition of the PGM via nebulization and spray onto the substrate does not lead to a measurable additional increase in backpressure of the catalytic article composed of substrate and the washcoat.

The step of preparing the slurry comprises a technique selected from incipient wetness impregnation, incipient wetness co-impregnation, and post-addition.

Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 minutes to 3 hours. The above process can be repeated as needed to reach the desired level of loading of the active metal by means of impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, colloidal zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1.0-5.0 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3.0 to 12.

The slurry can be milled to reduce the particle size and enhance particle mixing. The milling is accomplished in a ball mill, continuous mill, or other similar equipment, and the solids content of the slurry may be, e.g., about 20-60 wt.

%, more particularly about 20-40 wt. %. In one embodiment, the post-milling slurry is characterized by a $D_{90}$ particle size of about 3.0 to about 40 microns, preferably 10 to about 30 microns, more preferably about 10 to about 15 microns. The $D_{90}$ is determined using a dedicated particle size analyser. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 minutes-3 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of about 850° C. to about 1050° C. in an environment of 10 vol. % water in an alternating hydrocarbon/air feed for 50-75 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at about 850° C. to about 1050° C., 10 vol. % water in an alternating hydrocarbon/air feed, 50-75 hours aging).

The presently claimed invention also provides an apparatus for providing three-dimensional axial and/or radial zone arrangement and thereby making the emission control catalyst article, the apparatus comprising a PGM precursor solution storage unit, a dosing unit for PGM precursor solution, at least one PGM precursor solution supply tube connected to the dosing unit, a spray nozzle connected to the dosing unit via a second supply tube, a control arm device connected to the spray nozzle that is optionally connected to an air supply means, wherein said control arm device adapted to allow the 3-D positioning of the nozzle relative to a substrate face, and optionally, an additional air supply or diversion means, optionally with vacuum capability, said apparatus is adapted to spray a PGM precursor solution and create a three-dimensional axial and/or radial zone arrangement comprising a geometric shape starting from an inlet or outlet axial end of the substrate. The PGM enrichment zone is deposited onto the washcoated substrate using an apparatus described herein above that uses a nozzle to nebulize and disperse the PGM-containing solution onto the blank or previously washcoated substrate. The axial and radial PGM enrichment zone shape is controlled through a combination of nozzle shape and solution delivery speed as well as solution supply rate and the supply air pressure. The substrate coating profile is further controlled by adjusting the nozzle movement in a 3-dimensional space above the face of the to-be-coated substrate. The substrate is placed in the coating cell such that the to-be-coated face is pointed towards the coating nozzle. The unit is then programmed such that that a desired amount of the PGM precursor is deposited via the nozzle. The coating then begins with the control arm moving over a substrate face at a predetermined speed and at a three-dimensional position relative to the face while the nebulized PGM precursor solution is deposited on the substrate. The PGM precursor dosing rate and the supply air pressure are set such that the desired deposition speed and penetration length is obtained. The spray deposition can be optionally further assisted using the supply air or vacuum capability provided by the apparatus, such that the nebulized PGM solution deposited by the nozzle can be guided on the substrate when desired. Upon process completion, the substrate is removed, and the next substrate is loaded in the cell. The PGM control is performed by weighing the substrate before and after coating. Optionally, the weighing can be performed during spray coating.

In another aspect, there is provided an exhaust system for internal combustion engines, said system comprising the catalyst article according to the presently claimed invention.

In accordance with the presently claimed invention there is also provided a method of treating a gaseous exhaust stream comprising hydrocarbons, carbon monoxide, and nitrogen oxide, the method comprising contacting the exhaust stream with the catalyst article or the exhaust system according to the presently claimed invention.

In accordance with the presently claimed invention there is also provided a method of reducing hydrocarbons, carbon monoxide, and nitrogen oxide levels in a gaseous exhaust stream, the method comprising contacting the gaseous exhaust stream with the catalyst article or the exhaust system according to the presently claimed invention to reduce the levels of hydrocarbons, carbon monoxide, and nitrogen oxide in the exhaust gas.

In accordance with the presently claimed invention there is also provided use of the catalyst article according to the presently claimed invention for purifying a gaseous exhaust stream comprising hydrocarbons, carbon monoxide, and nitrogen oxide.

The invention provides for the following embodiments.

1. An emission control catalyst article comprising:

a substrate having an inlet axial end and an outlet axial end, a bottom washcoat layer coated on the 60 to 100% length of the substrate from the inlet axial end to the outlet axial end, and a top washcoat layer coated on the 60 to 100% length of the substrate from the inlet axial end or the outlet axial end or both ends of the substrate such that the top coat covers at least 60% of the length of the bottom washcoat layer, wherein at least part of the top washcoat layer and/or the bottom washcoat layer comprises a first portion and a second portion, wherein the first portion begins at the inlet axial end or the outlet axial end of the substrate and exhibits a platinum group metal concentration of 2 to 100 times higher than the concentration of a platinum group metal in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft$^3$, as determined axially from a first end of the first portion to a second end of the first portion.

2. The emission control catalyst article according to embodiment 1, wherein the three-dimensional axial and/or radial zone arrangement starting from the inlet axial end or the outlet axial end or both is a geometric shape having a base covering from 20 to 100% of a substrate face from the respective substrate end and volume from 5 and 50% of the substrate volume.

3. The emission control catalyst article according to any of embodiments 1 to 2, wherein the three-dimensional axial and/or radial zone arrangement comprises a geometric shape selected from a cone, a tapered cone, an asymmetric cone, a round cylinder, an elliptic cylinder, a polygonic cylinder, a round pyramid, an elliptic pyramid, a polygonic pyramid, a cuboid, a paraboloid, a half-ellipsoid, a semi-sphere, a polygonic prism, a parallelepiped, a rhombohedron, a polyhedron and a hyperboloid.

4. The emission control catalyst article according to any one of embodiments 1 to 3, wherein the three-dimensional axial and/or radial zone arrangement starting from the inlet axial end or the outlet end or both with a geometric shape is being created through axial, radial or simultaneous axial and radial coating of the substrate using a spray nozzle or an apparatus comprising a spray nozzle.

5. The emission control catalyst article according to any one of embodiments 1 to 4, wherein the first portion is an enrichment zone formed by coating at least a portion of the top washcoat layer and/or the bottom washcoat layer, which is optionally pre-loaded with a platinum group metal on the total length of the substrate, with an additional platinum group metal solution that is deposited in a nebulized form.

6. The catalyst article according to any one of embodiments 1 to 5, wherein the platinum group metal is selected from platinum, palladium, rhodium and a combination thereof.

7. The catalyst article according to any one of embodiments 1 to 6, wherein the platinum group metal is supported on a support selected from oxygen storage component, alumina component, ceria component, zirconia component and a combination thereof.

8. The catalyst article according to any one of embodiments 1 to 7, wherein the first portion has an axial length ranging from 5-50% of the substrate from the inlet end or the outlet end and covers 20-100% of a substrate inlet or outlet face such that the total volume of a formed geometric shape is from 5 to 50% of the substrate volume.

9. The catalyst article according of any one of embodiments 1 to 8, wherein 50% or more of platinum group metal in the first portion exists in the uppermost % of the first portion, as determined by an electron-probe microanalysis (EPMA) line scan from an uppermost layer of the of the first portion of the enriched washcoat layer to the substrate.

10. The catalyst article according to any one of embodiments 1 to 9, wherein at least 40-100% of platinum group metal in the first portion is distributed with a gradient no more than 50% through the washcoat within the first portion, as determined by an electron-probe microanalysis (EPMA) line scan from an uppermost layer of the first portion to the substrate.

11. The catalyst article according to any one of embodiments 1 to 10, wherein 50% to 95% of platinum group metal in the first portion exists in an uppermost % of the first portion, as determined by an electron-probe microanalysis (EPMA) line scan from an uppermost layer of the of the first portion of the enriched washcoat layer to the substrate.

12. The catalyst article according to any one of embodiments 1 to 11, wherein the first portion comprises palladium.

13. The catalyst article according to any one of embodiments 1 to 12, wherein the first portion comprises platinum.

14. The catalyst article according to any one of embodiments 1 to 13, wherein the first portion comprises rhodium.

15. The catalyst article according to any one of embodiments 1 to 14, wherein the article comprises:

a bottom washcoat layer comprising palladium or platinum deposited on a support selected from oxygen storage component, alumina component and a combination thereof, coated on the 60 to 100% length of the substrate from the inlet axial end to the outlet axial end;

wherein at least part of the bottom washcoat layer comprises a first portion and a second portion, wherein the first portion begins at the inlet axial end or the outlet axial end of the substrate and comprises palladium or platinum optionally supported on a support selected from oxygen storage component, alumina component and a combination thereof, wherein the concentration of palladium or platinum in the first portion is 2 to 100 times higher than the concentration of palladium or platinum in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft$^3$, as determined axially from a first end of the first portion to a second end of the first portion, and a top washcoat layer comprising rhodium, platinum or a combination thereof impregnated on a support selected from oxygen storage component, alumina component and a combination thereof, coated on the 60 to 100% length of the substrate from either the inlet axial end or the outlet end of the substrate such that the top coat covers at least 60% of the length of the bottom washcoat layer.

16. The catalyst article according to any one of embodiments 1 to 15, wherein the article comprises:

a bottom washcoat layer comprising palladium impregnated on a support selected from oxygen storage component, alumina component and a combination thereof, coated on the 60 to 100% length of the substrate from the inlet axial end to the outlet axial end; and a top washcoat layer comprising rhodium, platinum, palladium or a combination thereof impregnated on a support selected from oxygen storage component, alumina component and a combination thereof, coated on the 60 to 100% length of the substrate from either the inlet or the outlet end of the substrate such that the top coat covers at least 60% of the length of the bottom washcoat layer, wherein at least part of the top washcoat layer comprises a first portion and a second portion, wherein the first portion begins at an inlet axial end of the substrate and comprises palladium or platinum optionally supported on a support selected from oxygen storage component, alumina component and a combination thereof, wherein the concentration of palladium or platinum in the first portion is 2 to 100 times higher than the concentration of palladium or platinum in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft$^3$, as determined axially from a first end of the first portion to a second end of the first portion.

17. The catalyst article according to any of embodiments 1 to 16, wherein the first portion comprises palladium, wherein the amount of palladium in the first portion is 30 to 100 wt. % of the total palladium present in the catalyst article.

18. The catalyst article according to any one of embodiments 1 to 17, wherein the first portion comprises platinum, wherein the amount of platinum in the first portion is 30 to 100 wt. % of the total platinum present in the catalyst article.

19. The catalyst article according to any of embodiments 1 to 18, wherein the weight ratio of the platinum group metal of the first portion to the platinum group metal of the second portion is 4.0 to 50.

20. The catalyst article according to any one of embodiments 1 to 19, wherein the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof; the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof; and the zirconia component comprises lanthana-zirconia, and barium-zirconia.

21. The catalyst article according to any one of embodiments 1 to 20, wherein the bottom washcoat layer comprises at least one alkaline earth metal oxide comprising barium oxide, strontium oxide, or any combination thereof, in an amount of 1.0 to 20 wt. %, based on the total weight of the top layer.

22. The catalyst article according to any one of embodiments 1 to 21, wherein the substrate is a ceramic substrate, metal substrate, ceramic foam substrate, polymer foam substrate or a woven fibre substrate.

23. A process for the preparation of an emission control catalyst article, the process comprises:

i. obtaining a slurry optionally comprising a platinum group metal impregnated onto at least one support and coating said slurry on the 60 to 100% length of the substrate from the inlet axial end to the outlet axial end of the substrate to obtain a bottom washcoat layer;

ii. coating at least a portion of the bottom washcoat layer which begins at an inlet axial end or outlet axial of the substrate with a nebulized platinum group metal precursor solution using a nozzle spray or an apparatus comprising a nozzle spray to create a three-dimensional axial and/or radial zone arrangement starting from the inlet axial end or the outlet end, followed by drying at a temperature of about 100 to 140° C. and calcination to obtain an enrichment zone; and iii. preparing a top washcoat coated on the 60 to 100% length of the substrate from either the inlet axial end or the outlet axial end of the substrate such that the top coat covers at least 60% of the length of the bottom washcoat layer, comprising obtaining a slurry comprising a platinum group metal impregnated onto at least one support and coating the slurry over the at least 60% length of the bottom washcoat.

24. A process for the preparation of an emission control catalyst article, the process comprises:

i. preparing a bottom washcoat layer coated on the 60 to 100% length of the substrate from the inlet axial end to the outlet axial end, comprising obtaining a slurry optionally containing a platinum group metal impregnated onto at least one support and coating said slurry on the total length of the substrate;

ii. preparing a top washcoat coated on the 60 to 100% length of the substrate from either the inlet axial end or the outlet axial end of the substrate such that the top coat covers at least 60% of the length of the bottom washcoat layer, comprising obtaining a slurry comprising a platinum group metal impregnated onto at least one support and coating the slurry over at least 60% length of the bottom washcoat; and iii. coating a portion of the top washcoat layer which begins at an inlet axial end or an outlet end of the substrate with a nebulized platinum group metal precursor solution using a nozzle spray or an apparatus comprising a nozzle spray to create a three-dimensional axial and/or radial zone arrangement starting from the inlet axial end or the outlet end, followed by drying at a temperature of about 100 to 140° C. and calcination to obtain an enrichment zone.

25. An apparatus for preparing the catalytic article according to any one of embodiments 1 to 22, wherein the apparatus comprising a PGM precursor solution storage unit, a dosing unit for PGM precursor solution, at least one PGM precursor solution supply tube connected to the dosing unit, a spray nozzle connected to the dosing unit via a second supply tube, a control arm device connected to the spray nozzle that is optionally connected to an air supply means, wherein said control arm device is adapted to allow the 3-D positioning of the nozzle relative to a substrate face, and optionally, an additional air supply or diversion means, optionally with vacuum capability, said apparatus is adapted to spray a PGM precursor solution and create a three-dimensional axial and/or radial zone arrangement comprising a geometric shape starting from an inlet or outlet axial end of the substrate.

26. An exhaust system for internal combustion engines, said system comprising an engine and the catalyst article according to any one of embodiments 1 to 22.

27. A method of treating a gaseous exhaust stream comprising hydrocarbons, carbon monoxide, and nitrogen oxide, the method comprising contacting the exhaust stream with the catalyst article according to any one of embodiments 1 to 22 or the exhaust system according to embodiment 26.

28. A method of reducing hydrocarbons, carbon monoxide, and nitrogen oxide levels in a gaseous exhaust stream, the method comprising contacting the gaseous exhaust stream with the catalyst article according to any one of embodiments 1 to 22 or the exhaust system according to embodiment 26 to reduce the levels of hydrocarbons, carbon monoxide, and nitrogen oxide in the exhaust gas.

29. Use of the catalyst article according to any one of embodiments 1 to 22 for purifying a gaseous exhaust stream comprising hydrocarbons, carbon monoxide, and nitrogen oxide.

EXAMPLES

Aspects of the presently claimed invention are more fully illustrated by the following examples, which are set forth to illustrate certain aspects of the present invention and are not to be construed as limiting thereof.

Figure 2:
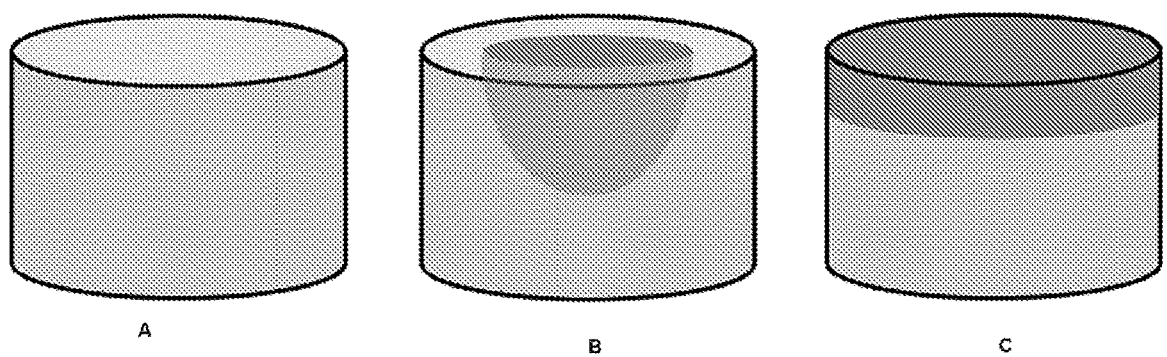
FIG. 2 is a schematic representation of catalyst article designs in exemplary configurations according to some embodiments of the presently claimed invention.

The catalyst of the invention having an enrichment zone formation via PGM nebulization and subsequent deposition using a nozzle is schematically shown in FIG. 1, wherein 10: PGM feed; 12: nozzle; 14: nebulized PGM; 16: radial zone; 18: axial zone; and 20: substrate. The demonstrated zone patterns or catalyst architecture created using axial/radial coating are illustrated in FIG. 2. These patterns, namely catalyst A (Reference Catalyst A: 0/96/4), B (Catalyst B: 0/76.8/4) and C (Catalyst C: 0/76.8/4) are shown for example purpose only and are not to be viewed as constraining for other possible enrichment zone shapes. There are several key parameters that can be optimized in order to achieve the desired enrichment zone shape and location, these include but are not limited to:

1) PGM precursor type and concentration;
2) Nozzle shape and aperture;
3) Supply air pressure;
4) PGM solution feed speed and pressure;
5) Nozzle orientation in space relative to the face of the coated substrate;
6) Deposition speed and duration; and
7) Substrate and, in case present, underlying washcoat type.

The deviations (%) from target of PGM loading onto the catalysts using a nebulized PGM precursor deposited via a nozzle for four exemplary consecutively prepared parts are shown in table 1.

TABLE 1

| Part-to-part deviation (%) of PGM deposition via spray | | | |
|---|---|---|---|
| Part # | Target (g) | Coated (g) | Deviation (%) based on nebulized PGM deposition |
| 1 | 13.66 | 13.59 | −0.50 |
| 2 | | 13.68 | 0.10 |
| 3 | | 13.55 | −0.80 |
| 4 | | 13.56 | −0.70 |

One of the key benefits of the approach presented schematically in FIG. 1 is that there is no need for a mask or any mechanical influencer in order to achieve the desired enrichment zone shape, location and PGM concentration. Furthermore, the method allows for high precision of PGM deposition. The accuracy of PGM deposition is exemplified in Table 1 showing the results of Pd deposition onto the coated substrates. The method allows for tight (<1%) deviation of PGM loading from the desired target.

Example 1 Preparation of CC1 Reference Catalyst A

Reference catalyst A is a Pd/Rh catalytic article with a PGM loading of 100 g/ft$^3$ (Pt/Pd/Rh=0/96/4). The catalyst A is a two-layer washcoat architecture coated onto a cylindrical monolith cordierite substrate having dimensions of 4.66" in diameter and 4.4" in length, a cell density of 900 cpsi, and a wall thickness of 2.5 mils.

Preparation of the bottom coat: 48 g/ft$^3$ of Pd (50 wt. % of the total Pd) in the form of palladium precursor solution was impregnated onto a refractory alumina, and 48 g/ft$^3$ of Pd (50 wt. % of the total Pd) in the form of palladium precursor solution was impregnated onto a stabilized ceria-zirconia composite with approximately 40 wt. % ceria. A slurry containing about 35.2 wt. % of the refractory Al$_2$O$_3$, 49.6 wt. % of the stabilized ceria-zirconia composite, barium acetate to yield 11.6 wt. % of BaO, zirconium acetate to yield 1.9 wt. % of ZrO$_2$, and 1.7 wt. % of Pd was coated onto the substrate. The washcoat loading of the bottom coat was about 2.59 g/in$^3$ after calcination at 550° C. for 1 hour in air.

Preparation of the top coat: 4 g/ft$^3$ of Rh (100 wt. % of the total Rh) in the form of rhodium precursor solution was impregnated onto a refractory alumina. A slurry mixture containing about 84.8 wt. % of the refractory Al$_2$O$_3$, 15.0 wt. % of a ceria-zirconia composite with approximately 50 wt. % ceria, and 0.23 wt. % of Rh was coated over the bottom coat. The washcoat loading of the top coat was about 1.00 g/in$^3$ after calcination at 550° C. for 1 hour in air. The reference Pd/Rh catalytic article is illustrated in FIG. 2.

Example 2: Preparation of CC1 Invention Catalyst B

Invention Catalyst B is a Pd/Rh catalytic article with a PGM loading of 80.8 g/ft$^3$ (Pt/Pd/Rh=0/76.8/4). Catalyst B has a washcoat architecture composed of a bottom coat, an additional PGM enrichment zone in the inlet side of the catalyst and a top coat coated onto a cylindrical monolith cordierite substrate having dimensions of 4.66" in diameter and 4.4" in length, a cell density of 900 cpsi, and a wall thickness of 2.5 mils.

Preparation of the bottom coat: Preparation of the bottom coat: 24 g/ft$^3$ of Pd (31.25 wt. % of the total Pd) in the form of palladium precursor solution was impregnated onto a refractory alumina, and 24 g/ft$^3$ of Pd (31.25 wt. % of the total Pd) in the form of palladium precursor solution was impregnated onto a stabilized ceria-zirconia composite with approximately 40 wt. % ceria. A slurry containing about 35.3 wt. % of the refractory Al$_2$O$_3$, 50.0 wt. % of the stabilized ceria-zirconia composite, barium acetate to yield 11.7 wt. % of BaO, zirconium acetate to yield 1.9 wt. % of ZrO$_2$, and 1.1 wt. % of Pd was coated onto the substrate. The washcoat loading of the bottom coat was about 2.57 g/in$^3$ after calcination at 550° C. for 1 hour in air.

Preparation of the enrichment zone in the inlet side of the catalyst: 305.7 g/ft$^3$ Pd (37.5% of the total Pd) in the form of palladium precursor solution were nebulized and deposited onto the inlet side of the washcoated substrate as shown schematically in FIG. 1 such that a Pd enrichment zone covering ~9.4% of the substrate volume and having a shape as shown schematically in FIG. 2 is formed. After the Pd enrichment zone deposition, the total Pd loading in the sample is 76.8 g/ft³ (or 80% of Reference Catalyst A) when the full substrate volume is considered. In a subsequent step, the substrate is dried at 120° C. for 30 minutes and calcined for 1 hour in air. The Pd enrichment into the underlying bottom coat was performed such that the full extent of the underlying washcoat is enriched with controlled gradient, in the case of Catalyst B, the gradient is limited to no more than 50% between the highest and lowest Pd concentration values in the resulting coating as determined from EPMA line profile.

Preparation of the top coat: 4 g/ft³ of Rh (100 wt. % of the total Rh) in the form of rhodium precursor solution were impregnated onto a refractory alumina. A slurry mixture containing about 84.8 wt. % of the refractory $Al_2O_3$, 15.0 wt. % of a ceria-zirconia composite with approximately 50 wt. % ceria and 0.2 wt. % of Rh was coated over the bottom coat. The washcoat loading of the top coat was about 1.00 g/in³ after calcination at 550° C. for 1 hour in air. Catalyst B is illustrated in FIG. 2.

Example 3: Preparation of CC1 Invention Catalyst C

Invention Catalyst C is a Pd/Rh catalytic article with a PGM loading of 80.8 g/ft³ (Pt/Pd/Rh=0/76.8/4). Catalyst C has a washcoat architecture composed of a bottom coat, an additional PGM enrichment zone in the inlet side of the catalyst and a top coat coated onto a cylindrical monolith cordierite substrate having dimensions of 4.66" in diameter and 4.4" in length, a cell density of 900 cpsi, and a wall thickness of 2.5 mils.

Preparation of the bottom coat: The bottom coat is identical to the bottom coat of the catalyst B.

Preparation of the enrichment zone in the inlet side of the catalyst: The enrichment zone is identical to the enrichment zone of catalyst B with the exception of change in zone shape. The enrichment zone volume still comprises ~9.4% of the total substrate volume, however the zone now covers the whole inlet and protrudes axially from the inlet towards the outlet side of the substrate, as shown in FIG. 2. After the Pd enrichment zone deposition, the total Pd loading in the sample is 76.8 g/ft³ (or 80% of Reference Catalyst A) when the full substrate volume is considered.

Preparation of the top coat: The top coat is identical to the top coat of the catalyst B. Catalyst C is illustrated in FIG. 2.

Example 4: Preparation of UF Reference Catalyst D

Reference Catalyst D is a Rh catalytic article with a PGM loading of 3 g/ft³ (Pt/Pd/Rh=0/0/3). The catalyst D is a single-layer washcoat architecture coated onto a cylindrical monolith cordierite substrate having dimensions of 4.66" in diameter and 4.4" in length, a cell density of 400 cpsi, and a wall thickness of 4 mils.

3 g/ft³ of Rh (100 wt. % of the total Rh) in the form of rhodium precursor solution was mixed with water, a refractory alumina and a stabilized ceria-zirconia composite with approximately 40 wt. % ceria. A slurry containing about 63.1 wt. % of the refractory $Al_2O_3$, 32.0 wt. % of the stabilized ceria-zirconia composite, barium acetate to yield 1.5 wt. % of BaO, zirconium acetate to yield 0.3 wt. % of $ZrO_2$, strontium acetate to yield 1.5 wt. % SrO and 0.1 wt. % of Rh was coated onto the substrate. The washcoat loading was about 2.8 g/in³ after calcination at 550° C. for 1 hour in air.

Example 5: Testing of Catalysts

All catalysts prepared in examples 1 to 4 were aged using an exothermic aging protocol using an engine setup to operate such that the typical inlet temperature is ~940° C. and the typical catalyst bed temperature does not exceed 1000° C. The engine-out gas feed composition alternates between rich and lean to simulate typical operating conditions for a vehicle tested under the FTP-75 test protocol. All CC1 catalysts as well as the UF Catalyst D were aged using the same conditions for 100 hours.

The emission performance was tested using a 2.0 L turbocharged ULEV70 vehicle with a CC1+UF emissions control system configuration operating under the FTP-75 test protocol. Each system was tested at least four times to assure high experiment repeatability and data consistency.

The benefit of using the PGM enrichment zone is demonstrated in Table 2.

TABLE 2

NMHC + $NO_x$ emission values obtained for the compared CC1 Catalysts A-C on the 2.0 L turbocharged ULEV70 vehicle with a CC1 + UF emissions control system when tested under FTP-75 test protocol conditions

| CC1 Catalyst | NMHC + $NO_x$ (mg/mile) |
|---|---|
| Reference Catalyst A 0/96/4 | 24.6 |
| Invention Catalyst B 0/76.8/4 | 21.3 |
| Invention Catalyst C 0/76.8/4 | 23.3 |

The invention catalysts demonstrate up to 10% NMHC+$NO_x$ emission reduction compared to the Pd/Rh reference Catalyst A. The said catalyst systems achieve SULEV30 or better NMHC+$NO_x$ performance under the chosen aging and testing conditions. Furthermore, the design specific PGM enrichment zone allows 20% Pd loading reduction without impacting the vehicle emissions.

Figure 3:
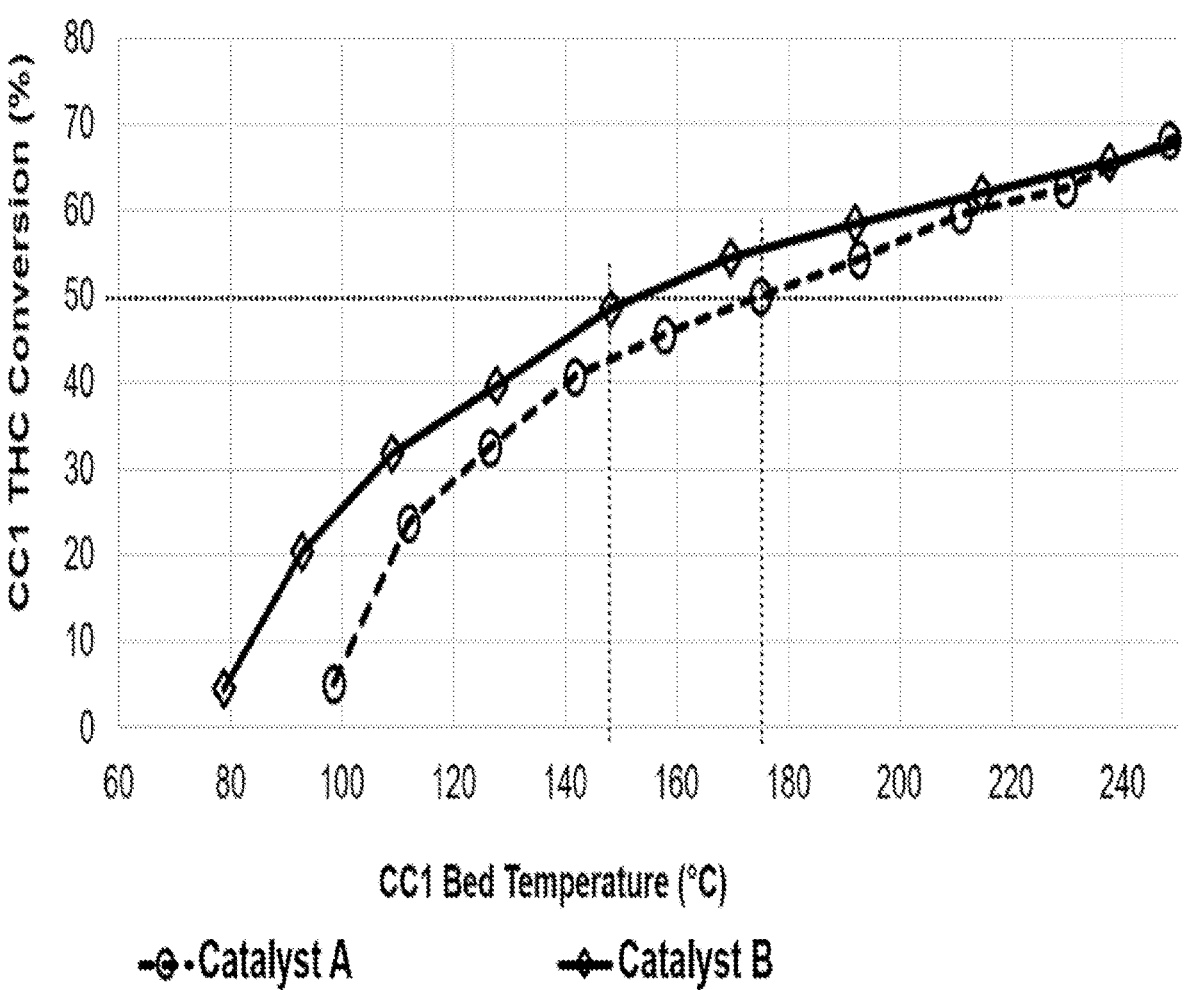
FIG. 3 showing the comparative light-off performance results for the reference and invention catalyst at identical PGM loading.

The improvement of the catalyst activity via the implementation of the proposed design architecture is attributed to reduced catalyst light-off temperatures and resulting lower emissions in the Bag-1 portion of the FTP-75 test. FIG. 3 summarizes the THC light-off curves for Catalyst A 0/96/4 and Catalyst B 0/76.8/4 as measured in the light-off portion of the FTP-75 test on the 2.0 L turbocharged ULEV70 vehicle with a CC1+UF emissions control system. Deposition of a PGM enrichment zone at the catalyst inlet leads to a reduction of the hydrocarbon light-off temperature by ~25° C. The improvement in the case of the example Catalyst B is observed at ~30-60% conversion at a catalyst bed temperature of ~120-200° C. Catalyst B achieves the light-off improvement with ~20% less PGM compared to the reference Catalyst A.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

The invention claimed is:

1. An emission control catalyst article comprising:

a substrate having an inlet axial end and an outlet axial end, a bottom washcoat layer coated on the 60 to 100% length of the substrate from the inlet axial end to the outlet axial end, and a top washcoat layer coated on the 60 to 100% length of the substrate from the inlet axial end or the outlet axial end or both ends of the substrate such that the top coat covers at least 60% of the length of the bottom washcoat layer, wherein at least part of the top washcoat layer and/or the bottom washcoat layer comprises a first portion and a second portion, wherein the first portion begins at the inlet axial end or the outlet axial end of the substrate and exhibits a platinum group metal concentration of 2 to 100 times higher than the concentration of a platinum group metal in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 g/ft$^3$, as determined axially from a first end of the first portion to a second end of the first portion;

wherein 50% or more of platinum group metal in the first portion exists in the top one-third portion of the depth of the first portion, as determined by an electron-probe microanalysis (EPMA) line scan from a top layer of the first portion to the substrate.

2. The emission control catalyst article according to claim 1, wherein the three-dimensional axial and/or radial zone arrangement starting from the inlet axial end or the outlet axial end or both is a geometric shape having a base covering from 20 to 100% of a substrate face from the respective substrate end and volume from 5 and 50% of the substrate volume.

3. The emission control catalyst article according to claim 1, wherein the three-dimensional axial and/or radial zone arrangement comprises a geometric shape selected from a cone, a tapered cone, an asymmetric cone, a round cylinder, an elliptic cylinder, a polygonic cylinder, a round pyramid, an elliptic pyramid, a polygonic pyramid, a cuboid, a paraboloid, a half-ellipsoid, a semi-sphere, a polygonic prism, a parallelepiped, a rhombohedron, a polyhedron and a hyperboloid.

4. The emission control catalyst article according to claim 1, wherein the three-dimensional axial and/or radial zone arrangement starting from the inlet axial end or the outlet end or both with a geometric shape is being created through axial, radial or simultaneous axial and radial coating of the substrate using a spray nozzle or an apparatus comprising a spray nozzle.

5. The emission control catalyst article according to claim 1, wherein the first portion is an enrichment zone formed by coating at least a portion of the top washcoat layer and/or the bottom washcoat layer, which is optionally pre-loaded with a platinum group metal on the total length of the substrate, with an additional platinum group metal solution that is deposited in a nebulized form.

6. The emission control catalyst article according to claim 1, wherein the platinum group metal is selected from platinum, palladium, rhodium and a combination thereof.

7. The emission control catalyst article according to claim 1, wherein the first portion has an axial length ranging from 5-50% of the substrate from the inlet end or the outlet end and covers 20-100% of a substrate inlet or outlet face such that the total volume of a formed geometric shape is from 5 to 50% of the substrate volume.

8. The emission control catalyst article according to claim 1, wherein at least 40-100% of platinum group metal in the first portion is distributed with a gradient no more than 50% between the highest and lowest platinum concentration values through the washcoat within the first portion, as determined by an electron-probe microanalysis (EPMA) line scan from a top layer of the first portion to the substrate.

9. The emission control catalyst article according to claim 1, wherein 50% to 95% of platinum group metal in the first portion exists in a top one-third portion of the depth of the first portion, as determined by an electron-probe microanalysis (EPMA) line scan from a top layer of the first portion to the substrate.

10. The emission control catalyst article according to claim 1, wherein the first portion comprises palladium.

11. The emission control catalyst article according to claim 1, wherein the first portion comprises platinum.

12. The emission control catalyst article according to claim 1, wherein the first portion comprises rhodium.

13. The emission control catalyst article according to claim 1, wherein the article comprises:

a bottom washcoat layer comprising palladium impregnated on a support selected from oxygen storage component, alumina component and a combination thereof, coated on the 60 to 100% length of the substrate from the inlet axial end to the outlet axial end; and a top washcoat layer comprising rhodium, platinum, palladium or a combination thereof impregnated on a support selected from oxygen storage component, alumina component and a combination thereof, coated on the 60 to 100% length of the substrate from either the inlet or the outlet end of the substrate such that the top coat covers at least 60% of the length of the bottom washcoat layer, wherein at least part of the top washcoat layer comprises a first portion and a second portion, wherein the first portion begins at an inlet axial end of the substrate and comprises palladium or platinum optionally supported on a support selected from oxygen storage component, alumina component and a combination thereof, wherein the concentration of palladium or platinum in the first portion is 2 to 100 times higher than the concentration of palladium or platinum in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 $g/ft^3$, as determined axially from a first end of the first portion to a second end of the first portion.

14. The emission control catalyst article according to claim 1, wherein the weight ratio of the platinum group metal of the first portion to the platinum group metal of the second portion is 4.0 to 50.

15. The emission control catalyst article according to claim 1, wherein the bottom washcoat layer comprises at least one alkaline earth metal oxide comprising barium oxide, strontium oxide, or any combination thereof, in an amount of 1.0 to 20 wt. %, based on the total weight of the top layer.

16. The emission control catalyst article according to claim 1, wherein the substrate is a ceramic substrate, metal substrate, ceramic foam substrate, polymer foam substrate or a woven fibre substrate.

17. An exhaust system for internal combustion engines, said system comprising an engine and the emission control catalyst article according to claim 1.

18. The emission control catalyst article according to claim 1, wherein the platinum group metal is supported on a support selected from oxygen storage component, alumina component, ceria component, zirconia component and a combination thereof.

19. The emission control catalyst article according to claim 18, wherein the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof; the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof; and the zirconia component comprises lanthana-zirconia, and barium-zirconia.

20. The emission control catalyst article according to claim 1, wherein the article comprises:

a bottom washcoat layer comprising palladium or platinum deposited on a support selected from oxygen storage component, alumina component and a combination thereof, coated on the 60 to 100% length of the substrate from the inlet axial end to the outlet axial end;

wherein at least part of the bottom washcoat layer comprises a first portion and a second portion, wherein the first portion begins at the inlet axial end or the outlet axial end of the substrate and comprises palladium or platinum optionally supported on a support selected from oxygen storage component, alumina component and a combination thereof, wherein the concentration of palladium or platinum in the first portion is 2 to 100 times higher than the concentration of palladium or platinum in the second portion, wherein the first portion comprises 5-50% of the substrate volume and exhibits a three-dimensional axial and/or radial zone arrangement starting from the inlet axial end of the substrate or the outlet axial end or both, wherein the platinum group metal loading in the first portion is 10 to 1000 $g/ft^3$, as determined axially from a first end of the first portion to a second end of the first portion, and a top washcoat layer comprising rhodium, platinum or a combination thereof impregnated on a support selected from oxygen storage component, alumina component and a combination thereof, coated on the 60 to 100% length of the substrate from either the inlet axial end or the outlet end of the substrate such that the top coat covers at least 60% of the length of the bottom washcoat layer.

21. The emission control catalyst article according to claim 20, wherein the first portion comprises palladium, wherein the amount of palladium in the first portion is 30 to 100 wt. % of the total palladium present in the catalyst article.

22. The emission control catalyst article according to claim 20, wherein the first portion comprises platinum, wherein the amount of platinum in the first portion is 30 to 100 wt. % of the total platinum present in the catalyst article.

* * * * *